US012159750B2

(12) United States Patent
Mizobata et al.

(10) Patent No.: US 12,159,750 B2
(45) Date of Patent: Dec. 3, 2024

(54) MULTILAYER COIL COMPONENT

(71) Applicant: Murata Manufacturing Co., Ltd., Kyoto-fu (JP)

(72) Inventors: Ryouji Mizobata, Nagaokakyo (JP); Makoto Hiraki, Nagaokakyo (JP); Katsuhisa Imada, Nagaokakyo (JP); Morihiro Hamano, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 779 days.

(21) Appl. No.: 17/169,255

(22) Filed: Feb. 5, 2021

(65) Prior Publication Data

US 2021/0249189 A1 Aug. 12, 2021

(30) Foreign Application Priority Data

Feb. 6, 2020 (JP) ................................ 2020-018918

(51) Int. Cl.

| | |
|---|---|
| ***H01F 27/32*** | (2006.01) |
| ***H01F 27/28*** | (2006.01) |
| ***H01F 27/29*** | (2006.01) |
| ***H01F 41/04*** | (2006.01) |
| ***H01F 41/12*** | (2006.01) |

(52) U.S. Cl.

CPC ....... *H01F 41/122* (2013.01); *H01F 27/2804* (2013.01); *H01F 27/29* (2013.01); *H01F 27/323* (2013.01); *H01F 27/327* (2013.01); *H01F 41/043* (2013.01); *H01F 41/127* (2013.01); *H01F 2027/2809* (2013.01)

(58) Field of Classification Search

CPC .... H01F 27/2804; H01F 27/29; H01F 27/323; H01F 27/327; H01F 2027/2809; H01F 17/0013; H01F 27/28

See application file for complete search history.

(56) References Cited

U.S. PATENT DOCUMENTS

2004/0084131 A1* 5/2004 Konoue ................ H01F 41/046 156/89.12
2011/0037557 A1* 2/2011 Konoue .................. H01F 27/34 336/200
2012/0326827 A1* 12/2012 Nanjyo ............... H01F 17/0033 336/200
2018/0019052 A1* 1/2018 Hashimoto ........... H01F 41/046
2018/0374636 A1* 12/2018 Itani ........................ H01F 27/24

FOREIGN PATENT DOCUMENTS

JP 2005-159301 A 6/2005
JP 2018011014 A 1/2018

* cited by examiner

*Primary Examiner* — Mang Tin Bik Lian

(74) *Attorney, Agent, or Firm* — Studebaker & Brackett PC

(57) ABSTRACT

A method for producing a multilayer coil component includes preparing an insulating sheet; forming a resin paste layer on the insulating sheet by using a resin paste; forming a conductive paste layer by using a conductive paste, the conductive paste layer covering the resin paste layer and having a projecting portion at a portion where a second void portion is to be formed; forming an insulating paste layer on the insulating sheet by using an insulating paste such that at least part of an upper surface of the conductive paste layer is exposed; stacking the insulating sheets having the resin paste layer, the conductive paste layer, and the insulating paste layer formed thereon to form a multilayer compact that includes the conductive paste layers connected into a coil shape; and firing the multilayer compact.

20 Claims, 7 Drawing Sheets

MULTILAYER COIL COMPONENT

CROSS-REFERENCE TO RELATED APPLICATION

This application claims benefit of priority to Japanese Patent Application No. 2020-018918, filed Feb. 6, 2020, the entire content of which is incorporated herein by reference.

BACKGROUND

Technical Field

The present disclosure relates to a multilayer coil component and a method for producing the same.

Background Art

A method for producing a multilayer coil component includes forming a coil pattern on an insulating sheet, stacking these sheets to obtain a multilayer compact, and firing the multilayer compact is known. In this method, in order to alleviate the stress between the coil and the insulating layers, voids are formed between the coil and the insulating layers in some cases, as described, for example, in Japanese Unexamined Patent Application Publication No. 2018-11014.

A multilayer coil component such as one described in Japanese Unexamined Patent Application Publication No. 2018-11014 has a void that extends outward from a side surface of a coil conductor. This extended portion of the void is formed by forming a resin layer in a portion where the void is to be formed and then removing the resin layer by firing. The multilayer body is pressure-bonded before firing; however, the resin layer has a different spring back amount from other insulating layers during pressure bonding, and thus is put under stress, possibly resulting in cracking in the element and degradation of reliability.

SUMMARY

Accordingly, the present disclosure provides a highly reliable multilayer coil component and a method for producing the same.

The present disclosure includes the following embodiments:

[1] A method for producing a multilayer coil component that includes an insulator portion, a coil that is embedded in the insulator portion and includes a plurality of coil conductor layers electrically connected to one another, and outer electrodes that are disposed on surfaces of the insulator portion and are electrically connected to the coil, in which the multilayer coil component has a first void portion between the insulator portion and a main surface of each of the coil conductor layers, and a second void portion that is at the same height as the first void portion and extends outward from side surfaces of each of the coil conductor layers in a horizontal direction. The method includes preparing an insulating sheet; forming a resin paste layer on the insulating sheet by using a resin paste; forming a conductive paste layer by using a conductive paste, the conductive paste layer covering the resin paste layer and having a projecting portion at a portion where a second void portion is to be formed; forming an insulating paste layer on the insulating sheet by using an insulating paste such that at least part of an upper surface of the conductive paste layer is exposed; stacking a plurality of the insulating sheets having the resin paste layer, the conductive paste layer, and the insulating paste layer formed thereon to form a multilayer compact that includes the conductive paste layers connected into a coil shape; and firing the multilayer compact.

[2] In the method described above, the conductive paste may have a PVC of 60% or more and 80% or less (i.e., from 60% to 80%).

[3] In the method described in [1] or [2], the conductive paste may be a silver paste.

[4] In the method described in any one of [1] to [3], the projecting portion may have a thickness of 1.0 μm or more and 10.0 μm or less (i.e., from 1.0 μm to 10.0 μm).

[5] In the method described in any one of [1] to [4], the projecting portion may have a width of 1.0 μm or more and 30.0 μm or less (i.e., from 1.0 μm to 30.0 μm).

[6] In the method described in any one of [1] to [5], the projecting portion may have a tapered shape that tapers toward an outer side of the conductive paste layer.

[7] In the method described in any one of [1] to [6], the conductive paste layer having the projecting portion may be formed by using a printing plate.

[8] A multilayer coil component including an insulator portion; a coil that is embedded in the insulator portion and includes a plurality of coil conductor layers electrically connected to one another; and outer electrodes that are disposed on surfaces of the insulator portion and are electrically connected to the coil, in which the multilayer coil component has a first void portion between the insulator portion and a main surface of each of the coil conductor layers, and a second void portion that is at the same height as the first void portion and extends outward from side surfaces of each of the coil conductor layers in a horizontal direction.

[9] In the multilayer coil component described in [8], each of the coil conductor layers may have a thickness of 1.0 μm or more and 90.0 μm or less (i.e., from 1.0 μm to 90.0 μm).

In the multilayer coil component described in [8] or [9], a ratio of a width of the first void portion to a width of the coil conductor layer may be 0.1 or more and 0.9 or less (i.e., from 0.1 to 0.9).

In the multilayer coil component described in any one of [8] to [10], the first void portion may have a thickness of 1.0 μm or more and 10.0 μm or less (i.e., from 1.0 μm to 10.0 μm).

In the multilayer coil component described in any one of [8] to [11], the second void portion may have a thickness of 1.0 μm or more and 10.0 μm or less (i.e., from 1.0 μm to 10.0 μm).

In the multilayer coil component described in any one of [8] to [12], the second void portion may have a width of 1.0 μm or more and 30.0 μm or less (i.e., from 1.0 μm to 30.0 μm).

In the multilayer coil component described in any one of [8] to [13], the second void portion may have a tapered shape that tapers toward an outer side of the coil conductor layer.

Other features, elements, characteristics and advantages of the present disclosure will become more apparent from the following detailed description of preferred embodiments of the present disclosure with reference to the attached drawings.

DETAILED DESCRIPTION

Figure 1:
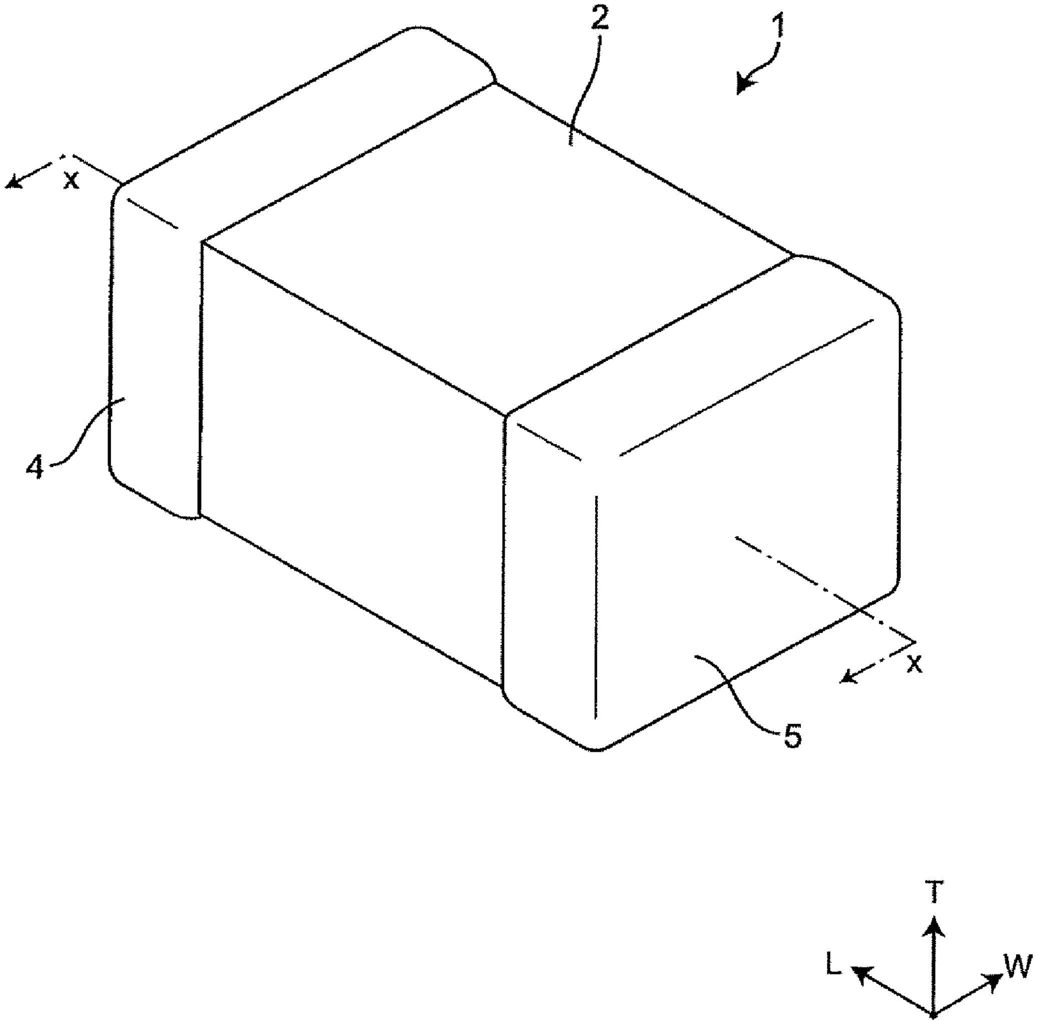
FIG. 1 is a schematic perspective view of a multilayer coil component 1 of the present disclosure.

The present disclosure will now be described in detail by referring to the drawings. The shape, arrangement, and other features of the multilayer coil component of this embodiment and respective constituent elements thereof are not limited by the examples illustrated in the drawings.

Figure 2:
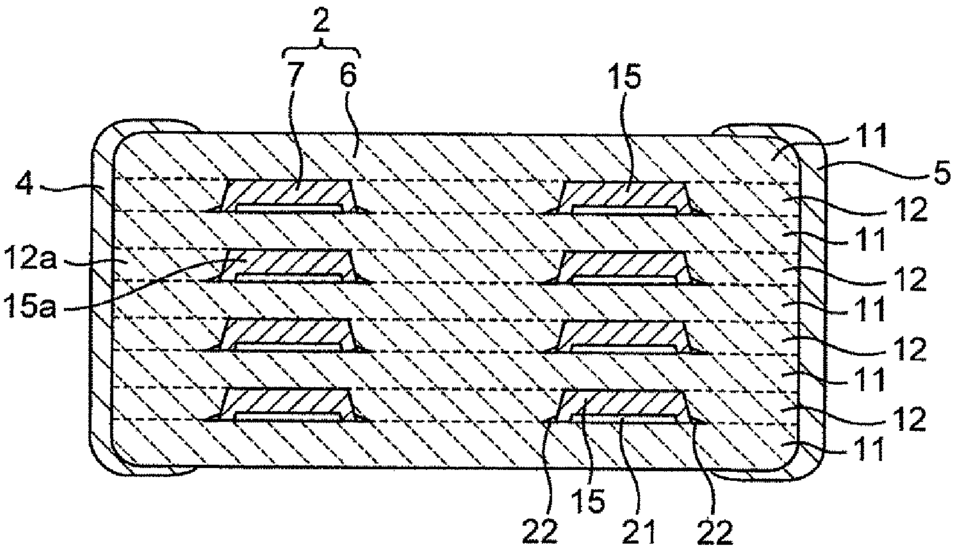
FIG. 2 is a cross-sectional view of the multilayer coil component 1 illustrated in FIG. 1 taken along line x-x.
Figure 3:
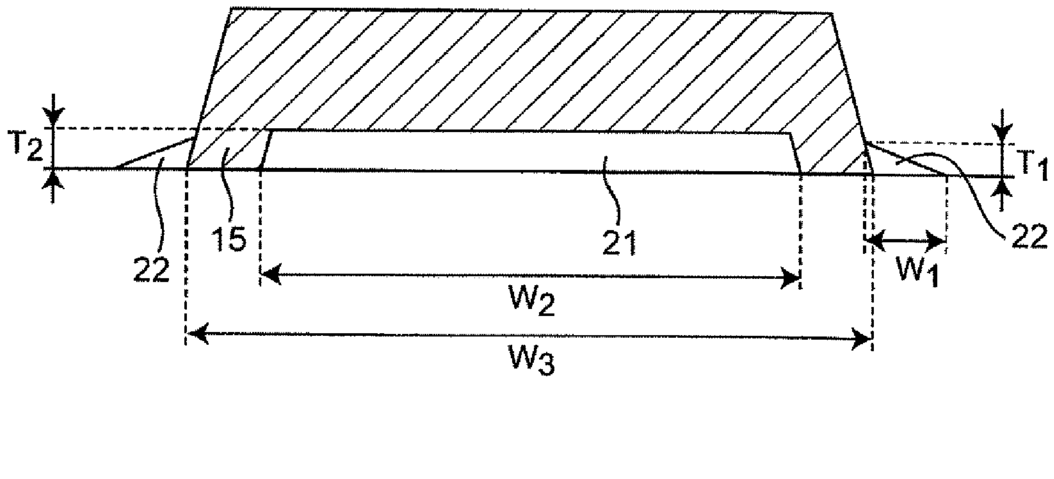
FIG. 3 is a cross-sectional view of a coil conductor layer, a first void portion, and a second void portion of the multilayer coil component illustrated in FIG. 1.

FIG. 1 is a perspective view of a multilayer coil component 1 of this embodiment, and FIG. 2 is a cross-sectional view taken along line x-x. FIG. 3 is an enlarged view of a coil conductor layer and a surrounding area thereof illustrated in the cross-sectional view in FIG. 2. However, the shape, arrangement, and other features of the multilayer coil component of this embodiment and respective constituent elements thereof described below are not limited by the examples illustrated in the drawings.

As illustrated in FIGS. 1 to 3, the multilayer coil component 1 of this embodiment has a substantially rectangular parallelepiped shape. In the multilayer coil component 1, surfaces perpendicular to an L axis in FIG. 1 are referred to as “end surfaces”, surfaces perpendicular to a W axis are referred to as “side surfaces”, and surfaces perpendicular to a T axis are referred to as “upper and lower surfaces”. The multilayer coil component 1 schematically includes an element body 2 and outer electrodes 4 and 5 respectively disposed on two end surfaces of the element body 2. The element body 2 includes an insulator portion 6 and a coil 7 embedded in the insulator portion 6. The insulator portion 6 includes first insulator layers 11 and second insulator layers 12. The coil 7 is constituted by coil conductor layers 15 that are connected into a coil shape by via conductors (not illustrated in the drawings) that penetrate through the first insulator layers 11. The coil 7 has two extended portions respectively at two ends thereof, and is connected to the outer electrodes 4 and 5 via these extended portions. A first void portion 21 is provided between the insulator portion 6 and a main surface (lower main surface in FIGS. 2 and 3) of the coil conductor layer 15, in other words, between the first insulator layer 11 and the coil conductor layer 15. A second void portion 22 that extends outward from side surfaces of the coil conductor layer in the horizontal direction is provided at the same height as the first void portion 21.

A method for producing the multilayer coil component 1 of the embodiment described above will now be described. In this embodiment, an example in which the insulator portion 6 is formed from a ferrite material is described.

(1) Preparation of Ferrite Paste

First, a ferrite material is prepared. The ferrite material contains, as main components, Fe, Zn, and Ni, and, if desired, Cu. Typically, the main components of the ferrite material are practically oxides of Fe, Zn, Ni, and Cu (ideally, $Fe_2O_3$, ZnO, NiO, and CuO).

To prepare the ferrite material, $Fe_2O_3$, ZnO, CuO, NiO, and, if needed, additive components are weighed to obtain a particular composition, and then mixed and pulverized. The pulverized ferrite material is dried and calcined at, for example, a temperature of 700 to 800° C. so as to obtain a calcined powder. To this calcined powder, particular amounts of a solvent (ketone solvent or the like), a resin (polyvinyl acetal or the like), and a plasticizer (alkyd plasticizer or the like) are added, the resulting mixture is kneaded in a planetary mixer or the like, and the kneaded mixture is dispersed with a three-roll mill or the like to prepare a ferrite paste.

(2) Preparation of Ferrite Sheets

Next, to a calcined powder of a ferrite material obtained in the same manner as that described above, an organic binder such as a polyvinyl butyral binder, and an organic solvent such as ethanol or toluene are added, and the resulting mixture is put in a pot mill along with PSZ balls to be mixed and pulverized. The obtained mixture is then formed into sheets having particular thickness, size, and shape by a doctor blade method or the like. As a result, ferrite sheets can be prepared.

In the ferrite material described above, the Fe content based on $Fe_2O_3$ is preferably about 40.0 mol % or more and about 49.5 mol % or less (i.e., from about 40.0 mol % to about 49.5 mol %) (with reference to the total of main components, the same applies hereinafter), and is more preferably about 45.0 mol % or more and about 49.5 mol % or less (i.e., from about 45.0 mol % to about 49.5 mol %).

In the ferrite material described above, the Zn content based on ZnO is preferably about 5.0 mol % or more and about 35.0 mol % or less (i.e., from about 5.0 mol % or more and about 35.0 mol %) (with reference to the total of main components, the same applies hereinafter), and is more preferably about 10.0 mol % or more and about 30.0 mol % or less (i.e., from about 10.0 mol % to about 30.0 mol %).

In the ferrite material described above, the Cu content based on CuO is preferably about 4.0 mol % or more and about 12.0 mol % or less (i.e., from about 4.0 mol % to about 12.0 mol %) (with reference to the total of main components, the same applies hereinafter), and is more preferably about 7.0 mol % or more and about 10.0 mol % or less (i.e., from about 7.0 mol % to about 10.0 mol %).

The Ni content in the ferrite material described above is not particularly limited, and can be the balance of the aforementioned other main components, Fe, Zn, and Cu.

In one embodiment, the ferrite material contains about 40.0 mol % or more and about 49.5 mol % or less of Fe (i.e., from about 40.0 mol % to about 49.5 mol %) based on $Fe_2O_3$, about 5.0 mol % or more and about 35.0 mol % or less of Zn (i.e., from about 5.0 mol % to about 35.0 mol %) based on ZnO, about 4.0 mol % or more and about 12.0 mol % or less of Cu (i.e., from about 4.0 mol % to about 12.0 mol %) based on CuO, and the balance being NiO.

In the present disclosure, the ferrite material may further contain additive components. Examples of the additive components for the ferrite material include, but are not limited to, Mn, Co, Sn, Bi, and Si. The Mn, Co, Sn, Bi, and Si contents (added amounts) respectively based on $Mn_3O_4$, $Co_3O_4$, $SnO_2$, $Bi_2O_3$, and $SiO_2$ with respect to a total of 100 parts by weight of the main components (Fe (based on $Fe_2O_3$), Zn (based on ZnO), Cu (based on CuO), and Ni (based on NiO)) are each preferably about 0.1 parts by weight or more and about 1 part by weight or less (i.e., from about 0.1 parts by weight to about 1 part by weight). The ferrite material may further contain impurities that are unavoidable during the production.

The Fe content (based on $Fe_2O_3$), the Mn content (based on $Mn_2O_3$), the Cu content (based on CuO), the Zn content (based on ZnO), and the Ni content (based on NiO) in the sintered ferrite may be considered to be substantially the same as the Fe content (based on $Fe_2O_3$), the Mn content (based on $Mn_2O_3$), the Cu content (based on CuO), the Zn content (based on ZnO), and the Ni content (based on NiO) in the ferrite material before firing.

(3) Preparation of Conductive Paste for Coil Conductor

First, a conductive material is prepared. Examples of the conductive material include Au, Ag, Cu, Pd, and Ni, of which Ag or Cu is preferable and Ag is more preferable. A particular amount of a powder of the conductive material is weighed and kneaded along with particular amounts of a solvent (such as eugenol), a resin (such as ethyl cellulose), and a dispersant in a planetary mixer or the like, and then the resulting mixture is dispersed in a three-roll mill or the like. As a result, a conductive paste for the coil conductor can be prepared.

When preparing the conductive paste described above, the pigment volume concentration (PVC) which is the concentration of the volume of the conductive material relative to the total volume of the conductive material (typically, a silver powder) and the resin component in the conductive paste is adjusted so as to prepare two types of conductive pastes (high-shrinkage conductive paste (A) and low-shrinkage conductive paste (B)) that exhibit different shrinkage ratios when fired (hereinafter, these shrinkage ratios are referred to as "firing shrinkage ratios").

The firing shrinkage ratio of the high-shrinkage conductive paste is preferably about 15% or more and about 20% or less (i.e., from about 15% to about 20%).

The firing shrinkage ratio of the low-shrinkage conductive paste is preferably about 5% or more and about 15% or less (i.e., from about 5% to about 15%).

The PVC of the high-shrinkage conductive paste is preferably about 60% or more and about 80% or less (i.e., from about 60% to about 80%).

The PVC of the low-shrinkage conductive paste is greater than the PVC of the high-shrinkage conductive paste, and is preferably about 80% or more and about 90% or less (i.e., from about 80% to about 90%).

Here, the shrinkage ratio can be determined by applying the conductive paste to a polyethylene terephthalate (PET) film, drying the applied paste, cutting the dried paste into a size of about 5 mm×5 mm, and then measuring the change in dimension of the resulting sample by using a thermomechanical analyzer (TMA).

The PVC can be determined by measuring the weight ratio between the conductive material and the resin component by thermogravimetry (TG) and then determining the PVC from the densities of the conductive material and the resin component.

(4) Preparation of Resin Paste

A resin paste for forming void portions in the multilayer coil component 1 is prepared. The resin paste can be prepared by adding, to a solvent (such as isophorone), a resin (such as an acrylic resin) that disappears when fired.

(5) Preparation of Multilayer Coil Component (5-1) Preparation of Element Body

Figures 4A, 4B, 4C, 4D, 4E:
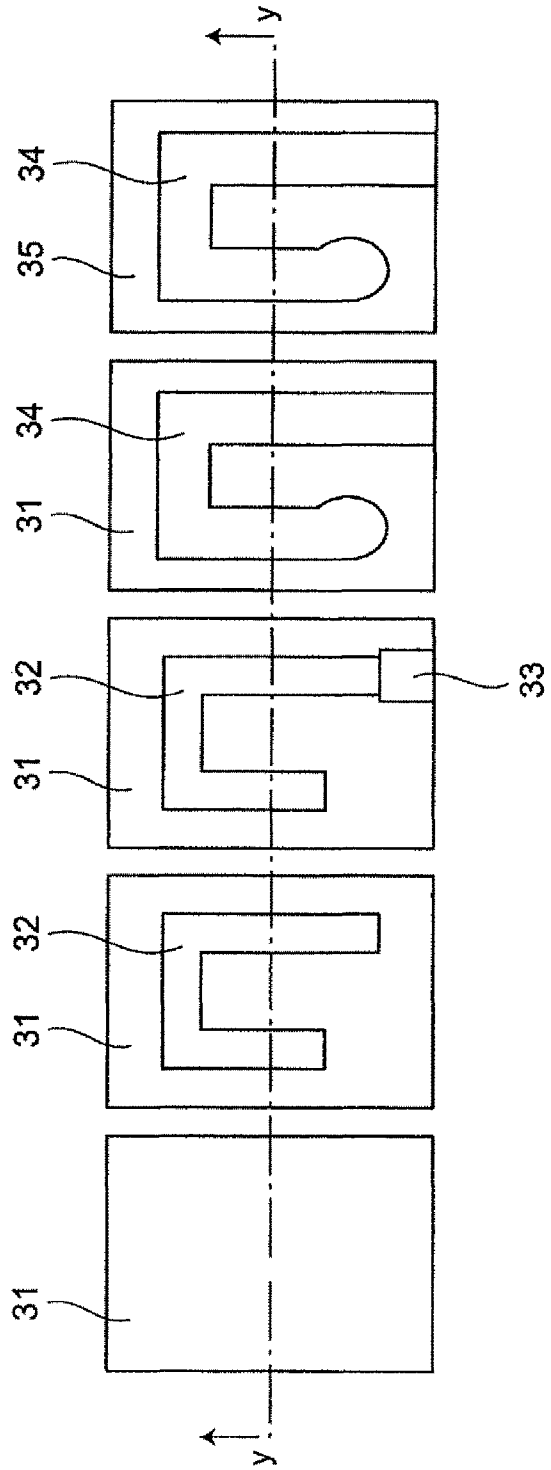
FIGS. 4A to 4E are diagrams illustrating a method for producing the multilayer coil component illustrated in FIG. 1.
Figure 5A:
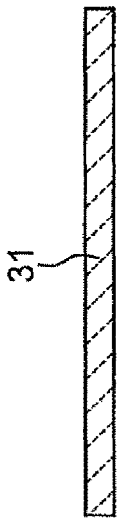
FIGS. 5A, 5B, 5D, and 5E are cross-sectional views corresponding to FIGS. 4A, 4B, 4D, and 4E.

First, a ferrite sheets 31 is prepared (FIGS. 4A and 5A). FIGS. 4A to 4E are plan views of a ferrite sheet as viewed from above, and FIGS. 5A to 5E are cross-sectional views of the ferrite sheet illustrated in FIGS. 4A to 4E.

Figure 5B:
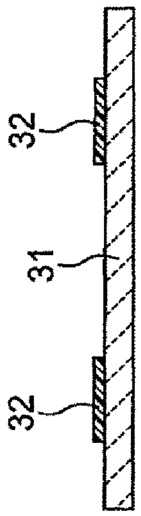

Next, the resin paste is applied by printing to a portion where the first void portion 21 is to be formed (in other words, a portion where the coil conductor layer is to be formed except for portions where the extended portion and the via are to be formed) so as to form a resin paste layer 32 (FIGS. 4B and 5B).

Next, the low-shrinkage conductive paste is applied by printing to a portion where the extended portion is to be formed so as to form a low-shrinkage conductive paste layer 33 (FIG. 4C).

Figure 5D:
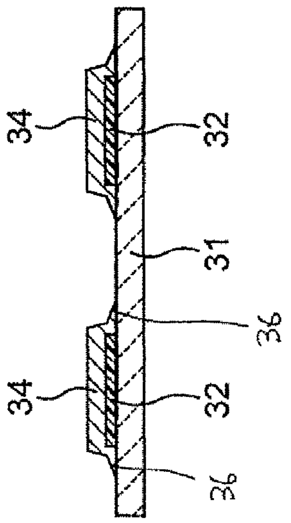

Next, the high-shrinkage conductive paste is applied by printing to the entirety of the portion where the coil conductor layer 15 is to be formed so as to form a high-shrinkage conductive paste layer 34 (FIGS. 4D and 5D). As illustrated in FIG. 5D, the high-shrinkage conductive paste layer 34 covers the resin paste layer 32 and has a projecting portion 36 at a portion where the second void portion is to be formed.

The widths of the projecting portion 36 is preferably about 1.0 μm or more and about 30.0 μm or less (i.e., from about 1.0 μm to about 30.0 μm), more preferably about 2.0 μm or more and about 20.0 μm or less (i.e., from about 2.0 μm to about 20.0 μm), and particularly preferably about 2.0 μm or more and about 10.0 μm or less (i.e., from about 2.0 μm to about 10.0 μm).

The thickness of the projecting portion 36 is preferably about 1.0 μm or more and about 10.0 μm or less (i.e., from about 1.0 μm to about 10.0 μm), more preferably about 2.0 μm or more and about 8.0 μm or less (i.e., from about 2.0 μm to about 8.0 μm), and yet more preferably about 3.0 μm or more and about 6.0 μm or less (i.e., from about 3.0 μm to about 6.0 μm).

The projecting portion 36 has a tapered shape that tapers toward the outer side of the conductive paste layer. In other words, as illustrated in FIG. 5D, in a cross section perpendicular to the winding direction, the projecting portion 36 has a thickness that decreases toward the outer side of the high-shrinkage conductive paste layer 34. When the coil conductor layer is formed from the high-shrinkage conductive paste, a void is formed in the projecting portion due to firing shrinkage, and thus, cracking that occurs from end portions of the coil conductor layer can be further suppressed.

The high-shrinkage conductive paste layer 34 may be formed by using a printing plate having the shape of the projecting portion 36, or may be formed by applying the high-shrinkage conductive paste such that the high-shrinkage conductive paste spreads from the resin paste layer 32 over the ferrite sheet 31.

Figure 5E:
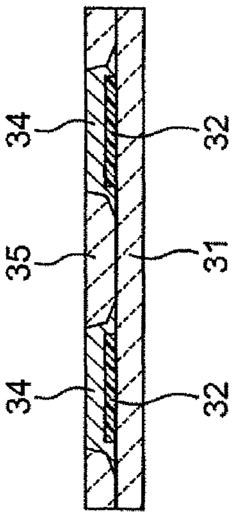

Next, the ferrite paste described above is applied by printing to the region where the high-shrinkage conductive paste layer 34 is not formed so that the applied ferrite paste has the same height as the high-shrinkage conductive paste layers 34, thereby forming a ferrite paste layer 35 (FIGS. 4E and 5E).

A first pattern sheet is formed by the aforementioned process.

Figure 6D:
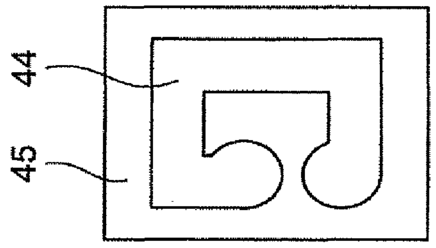
FIGS. 6A to 6D are diagrams illustrating a method for producing the multilayer coil component illustrated in FIG. 1.
Figure 6C:
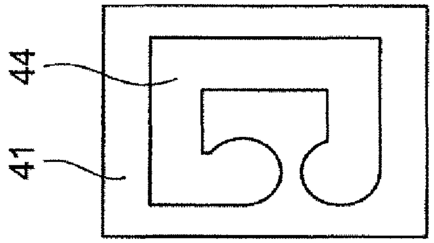

Another ferrite sheet 41 is separately prepared. A via hole 42 is formed in a particular portion of the ferrite sheet 41 (FIG. 6A).

Figure 6B:
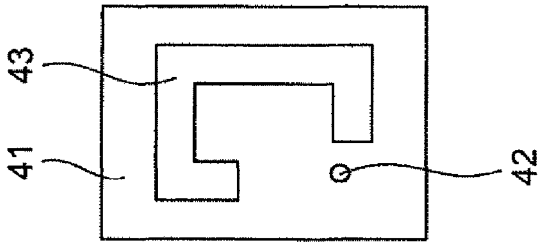
Figure 6A:
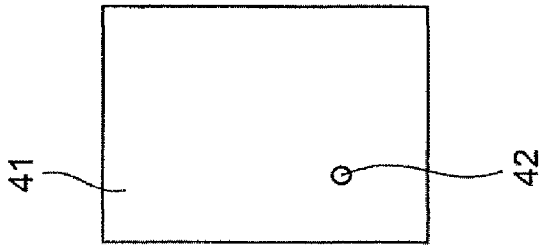
Figure 7A:
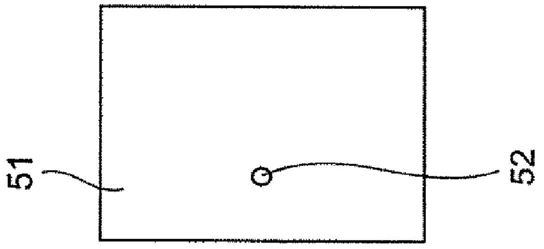
FIGS. 7A to 7D are diagrams illustrating the method for producing the multilayer coil component illustrated in FIG. 1.
Figure 7B:
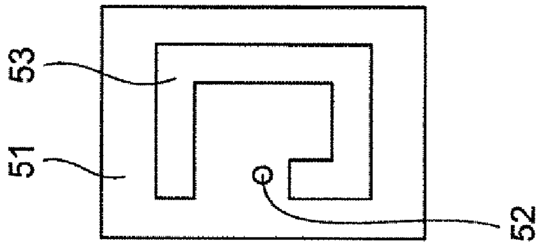
Figure 7C:
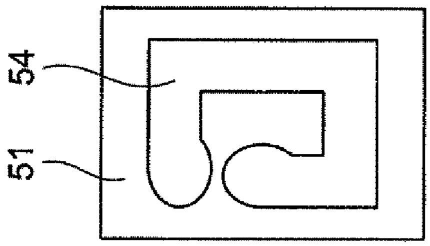
Figure 7D:
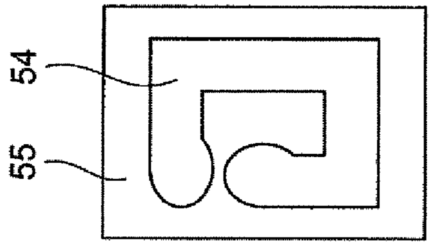
Figure 8E:
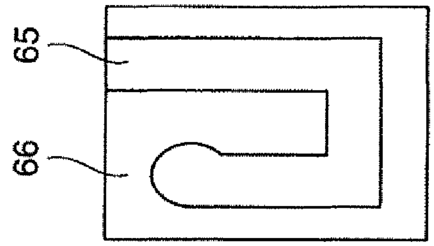
FIGS. 8A to 8E are diagrams illustrating the method for producing the multilayer coil component illustrated in FIG. 1.
Figure 8D:
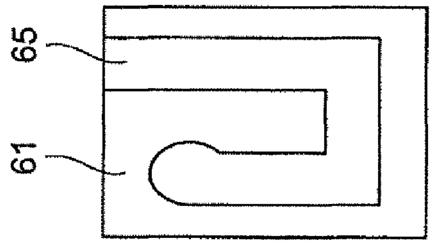
Figure 8C:
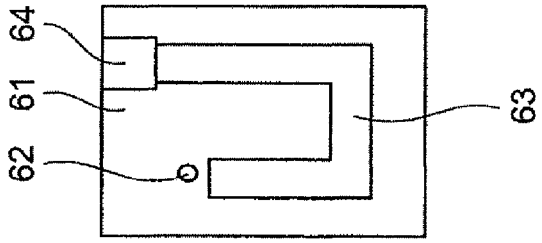
Figure 8B:
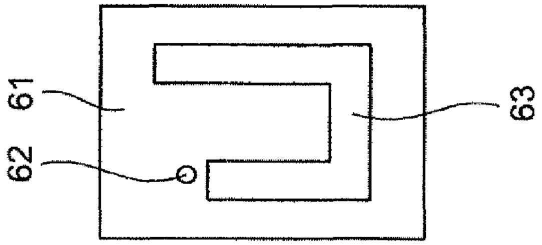
Figure 8A:
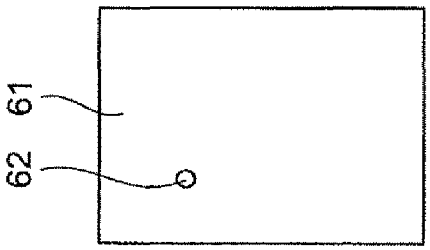

Next, the resin paste is applied by printing to a portion where the first void portion 21 is to be formed so as to form a resin paste layer 43 (FIG. 6B).

Next, the high-shrinkage conductive paste is applied by printing to the entirety of the portion where the coil conductor layer is to be formed so as to form a high-shrinkage conductive paste layer 44 (FIG. 6C).

Next, the ferrite paste described above is applied by printing to the region where the high-shrinkage conductive paste layer 44 is not formed so that the applied ferrite paste has the same height as the high-shrinkage conductive paste layer 44, thereby forming a ferrite paste layer 45 (FIG. 6D).

A second pattern sheet is formed by the aforementioned process.

Another ferrite sheet 51 is prepared separately, and, as with the pattern sheet described above, a via hole 52, a resin paste layer 53, a high-shrinkage conductive paste layer 54, and a ferrite paste layer 55 are formed to obtain a third pattern sheet (FIGS. 7A to 7D).

Another ferrite sheet 61 is prepared separately, and, as with the pattern sheet described above, a via hole 62, a resin paste layer 63, a low-shrinkage conductive paste layer 64, a high-shrinkage conductive paste layer 65, and a ferrite paste layer 66 are formed to obtain a fourth pattern sheet (FIGS. 8A to 8D).

The first to fourth pattern sheets prepared as such are stacked on top of each other in this order to form a stack, two ferrite sheets with nothing printed thereon are respectively placed on the top and the bottom of the stack, and the resulting stack is thermally pressure-bonded to form a multilayer body block. During this process, according to the method of the present disclosure, the resin paste layer for forming void portions does not exist at side surfaces of the conductive paste layer where the stress is most concentrated during pressure-bonding; thus, cracking that occurs due to the difference in spring back amount is suppressed. The multilayer body block is cut by using a dicer or the like to obtain individual pieces.

The obtained element is subjected to a barrel process to round the corners of the element. The barrel process may be performed on a green multilayer body or a fired multilayer body. The barrel process may be a dry process or a wet process. The barrel process may involve scrubbing the elements against each other or performing the barrel process along with media.

After the barrel process, for example, the element is fired at a temperature of about 880° C. or higher and about 920° C. or lower (i.e., from about 880° C. to about 920° C.) to obtain an element body 2 of the multilayer coil component 1. As a result of firing, the resin paste layer disappears and the first void portion 21 is formed. In addition, as a result of firing, the silver paste shrinks, the projecting portion of the silver paste layer shrinks and is withdrawn toward the coil conductor, and thus a second void portion 22 is formed.

(5-2) Formation of Outer Electrodes

Next, an outer electrode-forming Ag paste containing Ag and glass is applied to the end surfaces of the element body 2 and baked to form base electrodes. Next, a Ni coating and a Sn coating are sequentially formed on each of the base electrodes by electrolytic plating to form outer electrodes. As a result, a multilayer coil component 1 as illustrated in FIG. 1 is obtained.

The present disclosure provides the aforementioned production method, specifically, a method for producing a multilayer coil component that includes an insulator portion, a coil that is embedded in the insulator portion and includes a plurality of coil conductor layers electrically connected to one another, and outer electrodes that are disposed on surfaces of the insulator portion and are electrically connected to the coil, in which the multilayer coil component has a first void portion between the insulator portion and a main surface of each of the coil conductor layers, and a second void portion that is at the same height as the first void portion and extends outward from side surfaces of each of the coil conductor layers in a horizontal direction, the method including preparing an insulating sheet; forming a resin paste layer on the insulating sheet by using a resin paste; forming a conductive paste layer by using a conductive paste, the conductive paste layer covering the resin paste layer and having a projecting portion at a portion where a second void portion is to be formed; forming an insulating paste layer on the insulating sheet by using an insulating paste such that at least part of an upper surface of the conductive paste layer is exposed; stacking a plurality of the insulating sheets having the resin paste layer, the conductive paste layer, and the insulating paste layer formed thereon to form a multilayer compact that includes the conductive paste layers connected into a coil shape; and firing the multilayer compact.

In a preferred embodiment, the PVC of the conductive paste is about 60% or more and about 80% or less (i.e., from about 60% to about 80%).

One embodiment of the present disclosure has been described heretofore, but this embodiment is subject to various modifications.

For example, in the description above, ferrite sheets corresponding to the respective insulating layers are prepared, printing is performed on these sheets to form coil patterns, and the element is obtained by pressure-bonding these sheets; alternatively, the element may be obtained by forming all of the layers by printing sequentially.

The multilayer coil component produced by the method of the present disclosure described above rarely has defects such as cracking during production. Moreover, in the multilayer coil component produced by the method of the present disclosure, the presence of the first void portion 21 and the second void portion 22 prevents the internal stress from generating between the coil conductor layer and the insulator portion or alleviates the internal stress, thereby reducing defects such as cracking.

Thus, the present disclosure also provides a multilayer coil component obtained by the production method described above.

Specifically, the present disclosure provides a multilayer coil component that includes an insulator portion; a coil that is embedded in the insulator portion and includes a plurality of coil conductor layers electrically connected to one another; and outer electrodes that are disposed on surfaces of the insulator portion and are electrically connected to the coil, in which the multilayer coil component has a first void portion between the insulator portion and a main surface of each of the coil conductor layers, and a second void portion that is at the same height as the first void portion and extends outward from side surfaces of each of the coil conductor layers in a horizontal direction.

The element body 2 of the multilayer coil component 1 of this embodiment includes the insulator portion 6 and the coil 7.

The insulator portion 6 can include the first insulator layers 11 and the second insulator layers 12.

The first insulator layers 11 are each disposed between two coil conductor layers 15 that are adjacent to each other in the stacking direction and between one coil conductor layer 15 and the upper or lower surface of the element body.

Each of the second insulator layers 12 is disposed around the coil conductor layer 15 so as to expose the upper surface (the upper main surface in FIG. 2) of the coil conductor layer 15. In other words, the second insulator layer 12 forms a layer that lies at the same height as the coil conductor layer 15 in the stacking direction. For example, in FIG. 2, a second insulator layer 12*a* is positioned at the same height as the coil conductor layer 15*a* in the stacking direction.

In one embodiment, the second insulator layer 12 may have a portion that extends over an outer peripheral portion of the coil conductor layer 15. In other words, the second insulator layer 12 may have a portion that covers the outer peripheral portion of the coil conductor layer 15.

In one embodiment, the second insulator layer 12 can extend to the inner side of the outer edge of the coil conductor layer 15 when one coil conductor layer 15 and one second insulator layer 12 are viewed in plan from above.

The first insulator layers 11 and the second insulator layers 12 in the element body 2 may be monolithic. In such a case, the respective second insulator layers 12 can be considered to be present at the same height as the coil conductor layers 15.

The insulator portion 6 is preferably formed of a magnetic body and is more preferably formed of sintered ferrite. The sintered ferrite contains, as main components, at least Fe, Ni, and Zn. The sintered ferrite may further contain Cu.

The first insulator layers 11 and the second insulator layers 12 may have the same composition or different compositions. In a preferred embodiment, the first insulator layers 11 and the second insulator layers 12 have the same composition.

In one embodiment, the sintered ferrite contains, as main components, at least Fe, Ni, Zn, and Cu.

In the sintered ferrite described above, the Fe content based on $Fe_2O_3$ is preferably about 40.0 mol % or more and about 49.5 mol % or less (i.e., from about 40.0 mol % to about 49.5 mol %) (with reference to the total of main components, the same applies hereinafter), and is more preferably about 45.0 mol % or more and about 49.5 mol % or less (i.e., from about 45.0 mol % to about 49.5 mol %).

In the sintered ferrite described above, the Zn content based on ZnO is preferably about 5.0 mol % or more and about 35.0 mol % or less (i.e., from about 5.0 mol % to about 35.0 mol %) (with reference to the total of main components, the same applies hereinafter), and is more preferably about 10.0 mol % or more and about 30.0 mol % or less (i.e., from about 10.0 mol % to about 30.0 mol %).

In the sintered ferrite described above, the Cu content based on CuO is preferably about 4.0 mol % or more and about 12.0 mol % or less (i.e., from about 4.0 mol % to about 12.0 mol %) (with reference to the total of main components, the same applies hereinafter), and is more preferably about 7.0 mol % or more and about 10.0 mol % or less (i.e., from about 7.0 mol % to about 10.0 mol %).

The Ni content in the sintered ferrite described above is not particularly limited, and may be the balance of the aforementioned other main components, Fe, Zn, and Cu.

In one embodiment, the sintered ferrite contains about 40.0 mol % or more and about 49.5 mol % or less of Fe (i.e., from about 40.0 mol % to about 49.5 mol %) based on $Fe_2O_3$, about 5.0 mol % or more and about 35.0 mol % or less of Zn (i.e., from about 5.0 mol % to about 35.0 mol %) based on ZnO, about 4.0 mol % or more and about 12.0 mol % of Cu (i.e., from about 4.0 mol % to about 12.0 mol %) based on CuO, and the balance being NiO.

In the present disclosure, the sintered ferrite may further contain additive components. Examples of the additive components for the sintered ferrite include, but are not limited to, Mn, Co, Sn, Bi, and Si. The Mn, Co, Sn, Bi, and Si contents (added amounts) respectively based on $Mn_3O_4$, $Co_3O_4$, $SnO_2$, $Bi_2O_3$, and $SiO_2$ with respect to a total of 100 parts by weight of the main components (Fe (based on $Fe_2O_3$), Zn (based on ZnO), Cu (based on CuO), and Ni (based on NiO)) are each preferably about 0.1 parts by weight or more and about 1 part by weight or less (i.e., from about 0.1 parts by weight to about 1 part by weight). The sintered ferrite may further contain impurities that are unavoidable during the production.

As described above, the coil 7 is constituted by the coil conductor layers 15 electrically connected to one another into a coil shape. The coil conductor layers 15 that are adjacent to each other in the stacking direction are connected to each other through a via conductor that penetrates the insulator portion 6.

The material constituting the coil conductor layers 15 is not particularly limited, and examples thereof include Au, Ag, Cu, Pd, and Ni. The material constituting the coil conductor layers 15 described above is preferably Ag or Cu, and is more preferably Ag. One conductive material or two or more conductive materials may be used.

The via conductor is formed to penetrate through the first insulator layer 11. The material constituting the via conductor can be a material described in relation to the coil conductor layers 15 above. The material constituting the via conductor may be the same as or different from the material constituting the coil conductor layers 15. In a preferred embodiment, the material constituting the via conductor is the same as the material constituting the coil conductor layers 15. In a preferred embodiment, the material constituting the via conductor is Ag.

In the coil 7 described above, the thickness of the coil conductor layer 15 in the extended portion is larger than the thickness of the coil conductor layer 15 in the winding portion. When the thickness of the coil conductor layer is larger in the extended portion, adhesion between the coil conductor layer in the extended portion and the insulator portion improves.

In this embodiment, the coil conductor layer 15 in the extended portion of the coil 7 described above includes a low-shrinkage layer having a relatively small firing shrinkage ratio (this layer corresponding to the low-shrinkage conductive paste layer 33 or 64) and a high-shrinkage layer having a relatively large shrinkage ratio (this layer corresponds to the high-shrinkage conductive paste layer 34 or 65) stacked on top of each other. When a low-shrinkage layer having a relatively small firing shrinkage ratio is stacked in the extended portion, shrinkage during firing is suppressed, occurrence of voids between the coil conductor layer in the extended portion and the insulator portion is suppressed, and thus adhesion between the coil conductor layer in the extended portion and the insulator portion is improved.

Meanwhile, the coil conductor layers 15 in the winding portion of the coil 7 can be high-shrinkage layers having a relatively large firing shrinkage ratio. When the coil conductor layers 15 in the winding portion are obtained by firing high-shrinkage layers having a relatively large firing shrinkage ratio, the first void portion 21 and the second void portion 22 that serve as stress-alleviating spaces can be formed with higher certainty.

In one embodiment, the low-shrinkage layer is formed of a material having a firing shrinkage ratio of about 5% or more and about 15% or less (i.e., from about 5% to about 15%).

In one embodiment, the high-shrinkage layer is formed of a material having a firing shrinkage ratio larger than that of the low-shrinkage layer and in the range of about 15% or more and about 20% or less (i.e., from about 15% to about 20%).

In the coil conductor layer 15 in the extended portion, the ratio of the thickness of the low-shrinkage layer to the thickness of the high-shrinkage ratio (low shrinkage layer/high shrinkage layer) is preferably about 0.2 or more and about 1.8 or less (i.e., from about 0.2 to about 1.8) and more preferably about 0.2 or more and about 0.8 or less (i.e., from about 0.2 to about 0.8).

The first void portion 21 and the second void portion 22 serve as what are known as stress-alleviating spaces.

The first void portion 21 is provided between the insulator portion 6 and a main surface of the coil conductor layer 15. Here, the main surface of the coil conductor layer refers to one of the two surfaces perpendicular to the stacking direction of the multilayer coil component. As illustrated in FIG. 2, the first void portion 21 is formed between the first insulator layer 11 and the lower main surface of the coil conductor layer 15.

The width ($W_2$ in FIG. 3) of the first void portion 21 is preferably about 10 μm or more and about 200 μm or less (i.e., from about 10 μm to about 200 μm), more preferably about 30 μm or more and about 150 μm or less (i.e., from about 30 μm to about 150 μm), and yet more preferably about 50 μm or more and about 100 μm or less (i.e., from about 50 μm to about 100 μm). Here, the width of the first void portion refers to a width of the widest portion in a direction perpendicular to both the coil winding direction and the stacking direction.

The ratio of the width of the first void portion 21 to the width ($W_3$ in FIG. 3) of the coil conductor layer 15 (void portion width ($W_2$)/conductor layer width ($W_3$)) is preferably about 0.1 or more and about 0.9 or less (i.e., from about 0.1 to 0.9), more preferably about 0.2 or more and about 0.8 or less (i.e., from about 0.2 to about 0.8), and yet more preferably about 0.3 or more and about 0.7 or less (i.e., from about 0.3 to about 0.7).

The thickness ($T_2$ in FIG. 3) of the first void portion 21 is preferably about 1.0 μm or more and about 10.0 μm or less (i.e., from about 1.0 μm to about 10.0 μm) and more preferably about 3.0 μm or more and about 8.0 μm or less (i.e., from about 3.0 μm to about 8.0 μm). Here, the thickness of the first void portion is the thickness in the stacking direction, and is the average of the thicknesses of five portions equally divided in the width direction.

The second void portion 22 is adjacent to side surfaces of the coil conductor layer 15 and is at the same height as the first void portion. The second void portion 22 extends outward from the side surfaces of the coil conductor layer 15 in the horizontal direction. Here, the side surfaces of the coil conductor layer refer to the two surfaces parallel to the coil winding direction and different from the aforementioned main surfaces. The "same height" means the same height in the stacking direction, and, in this embodiment, means that the voids are formed on the same ferrite sheet. The horizontal direction refers to the direction of a plane perpendicular to the stacking direction, and the phrase "outward in the horizontal direction" refers to the direction in which the distance with respect to a side surface of the coil conductor layer increases along a plane perpendicular to the stacking direction.

The width ($W_1$ in FIG. 3) of the second void portion 22 is preferably about 1.0 μm or more and about 30.0 μm or less (i.e., from about 1.0 μm to about 30.0 μm), more preferably about 2.0 μm or more and about 20.0 μm or less (i.e., from about 2.0 μm to about 20.0 μm), and particularly preferably about 2.0 μm or more and about 10.0 μm or less (i.e., from about 2.0 μm to about 10.0 μm). Here, the width of the second void portion refers to a width of the widest portion in a direction perpendicular to both the coil winding direction and the stacking direction.

The thickness ($T_1$ in FIG. 3) of the second void portion 22 is preferably about 1.0 μm or more and about 10.0 μm or less (i.e., from about 1.0 μm to about 10.0 μm), more preferably about 2.0 μm or more and about 8.0 μm or less (i.e., from about 2.0 μm to about 8.0 μm), and yet more preferably about 3.0 μm or more and about 6.0 μm or less (i.e., from about 3.0 μm to about 6.0 μm). Here, the thickness of the second void portion is the thickness of the thickest part in the stacking direction.

The width and the thickness of the void portions can be measured as follows.

A chip is polished with the LT surface of the chip facing an abrasive paper, and polishing is stopped at the W-dimension center portion in the coil conductor layer. Then the chip is observed with a microscope. The void width and thickness at the L-dimension center portion in the coil conductor layer are measured by using the measuring function of the microscope.

The second void portion 22 has a tapered shape that tapers toward the outer side. That is, as illustrated in FIG. 3, the thickness of the second void portion 22 decreases as the distance from the coil conductor layer 15 increases. This shape of the second void portion further suppresses cracking of the element.

The outer electrodes 4 and 5 are disposed to cover the two end surfaces of the element body 2. The outer electrodes 4 and 5 are preferably formed of at least one metal material selected from Au, Ag, Pd, Ni, Sn, and Cu.

The outer electrodes may each be a single layer or may be multilayered. In one embodiment, each of the outer electrodes is multilayered and is preferably formed of two or more and four or less layers (i.e., from two to four layers), for example, three layers.

In one embodiment, the outer electrodes are multilayered and can each include a Ag- or Pd-containing layer, a Ni-containing layer, or a Sn-containing layer. In a preferred embodiment, the outer electrodes each include a Ag- or Pd-containing layer, a Ni-containing layer, and a Sn-containing layer. Preferably, the aforementioned layers are arranged in the order of, from the coil conductor layer side, a Ag- or Pd-containing layer or preferably a Ag-containing layer, a Ni-containing layer, and a Sn-containing layer. Preferably, the Ag- or Pd-containing layer is a layer obtained by baking a Ag paste or Pd paste, and the Ni-containing layer and the Sn-containing layer can be plating layers.

The multilayer coil component of the present disclosure preferably has a length of about 0.4 mm or more and about 3.2 mm or less (i.e., from about 0.4 mm to about 3.2 mm), a width of about 0.2 mm or more and about 2.5 mm or less (i.e., from about 0.2 mm to about 2.5 mm), and a height of about 0.2 mm or more and about 2.0 mm or less (i.e., from about 0.2 mm to about 2.0 mm), and more preferably has a length of about 0.6 mm or more and about 2.0 mm or less (i.e., from about 0.6 mm to about 2.0 mm), a width of about 0.3 mm or more and about 1.3 mm or less (i.e., from about 0.3 mm to about 1.3 mm), and a height of about 0.3 mm or more and about 1.0 mm or less (i.e., from about 0.3 mm to about 1.0 mm).

EXAMPLES

Example

Preparation of Ferrite Paste $Fe_2O_3$, ZnO, CuO, and NiO powders were respectively weighed into 49.0 mol %, 25.0 mol %, 8.0 mol %, and the balance with respect to the total of these powders. The powders were then placed in a ball mill along with PSZ media, pure water, and a dispersant, wet-mixed, pulverized, dried, and calcined at 700° C. to obtain a calcined powder. To the calcined powder, particular amounts a ketone solvent, polyvinyl acetal, and an alkyd plasticizer were added, the resulting mixture was kneaded in a planetary mixer, and then the kneaded mixture was further dispersed with a three-roll mill to prepare a ferrite paste.

Preparation of Ferrite Sheets

The ferrite material was weighed so that the composition thereof was the same as the ferrite paste described above. The weighed material was placed in a ball mill along with PSZ media, pure water, and a dispersant, wet-mixed, pulverized, dried, and calcined at a temperature of 700° C. to obtain a calcined powder. The obtained calcined powder, a polyvinyl butyral organic binder, ethanol, and toluene were placed in a pot mill along with PSZ balls, and were mixed and pulverized. The obtained mixture was formed into sheets by a doctor blade method. As a result, ferrite sheets were prepared.

Preparation of Conductive Paste for Coil Conductor

A particular amount of a silver powder was prepared as a conductive material and was kneaded in a planetary mixer along with eugenol, ethyl cellulose, and a dispersant, and the resulting mixture was dispersed in a three-roll mill to prepare a conductive paste for a coil conductor.

When preparing the conductive paste described above, the PVC was adjusted to prepare two conductive pastes (A) and (B) having different firing shrinkage ratios.

(A) High-shrinkage conductive paste (a shrinkage ratio of 15% at 800° C.)

(B) Low-shrinkage conductive paste (a shrinkage ratio of 10% at 800° C.)

Preparation of Resin Paste

Isophorone and an acrylic resin were mixed to prepare a resin paste.

Preparation of Multilayer Coil Component

By using the ferrite sheets, the ferrite paste, the high-shrinkage conductive paste, the low-shrinkage conductive paste, and the resin paste described above, pattern sheets were prepared by the process illustrated in FIGS. 4A to 8E, and the pattern sheets were pressure-bonded to form an assembly, which was a multilayer body block.

Next, the multilayer body block was cut by using a dicer or the like to obtain individual elements. The obtained element was subjected to a barrel process to round the corners of the element. After the barrel process, the element was fired at a temperature of 920° C. to obtain an element body.

Next, an outer electrode-forming Ag paste containing Ag and glass was applied to the end surfaces of the element body and baked to form base electrodes. Next, a Ni coating and a Sn coating were sequentially formed on each of the base electrodes by electrolytic plating so as to form outer electrodes. As a result, a multilayer coil component of Example was obtained.

Comparative Example

A multilayer coil component of Comparative Example was obtained as in Example described above except that the conductive paste layers were directly formed on the ferrite sheets 31, 41, 51, and 61 without forming the resin paste layers 32, 43, 53, and 63 and that the resin paste layers were formed so as to cover the conductive paste layers.

The samples (multilayer coil components) of Example and Comparative Example both had a length (L) of 1.0 mm, a width (W) of 0.5 mm, and a height (T) of 0.5 mm.

Evaluation

One hundred multilayer coil components of Example and one hundred multilayer coil components of Comparative Example obtained as above were evaluated as to whether there was cracking. The result is shown in the table below. The presence of cracking was confirmed by polishing the LT surface, stopping polishing at about the center portion, and observing the polished surface with a digital microscope.

TABLE

| | Number of cracks |
|---|---|
| Example | 0 |
| Comparative Example | 100 |

A multilayer coil component of the present disclosure can be used in a variety of usages including inductors.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A method for producing a multilayer coil component that includes an insulator portion, a coil that is embedded in the insulator portion and includes a plurality of coil conductor layers electrically connected to one another, and outer electrodes that are disposed on surfaces of the insulator portion and are electrically connected to the coil, in which the multilayer coil component has a first void portion between the insulator portion and a main surface of each of the coil conductor layers, and a second void portion that is at a same height as the first void portion and extends outward from side surfaces of each of the coil conductor layers in a horizontal direction, and a portion of the each of the coil conductor layers extends as a barrier between the first void portion and the second void portion so that the first void portion and the second void portion are out of communication with each other, the method comprising:

preparing an insulating sheet;

forming a resin paste layer on the insulating sheet by using a resin paste;

forming a conductive paste layer by using a conductive paste, the conductive paste layer covering the resin paste layer and having a projecting portion at a portion where a second void portion is to be formed;

forming an insulating paste layer on the insulating sheet by using an insulating paste such that at least part of an upper surface of the conductive paste layer is exposed;

stacking a plurality of the insulating sheets having the resin paste layer, the conductive paste layer, and the insulating paste layer formed thereon to form a multilayer compact that includes the conductive paste layers connected into a coil shape; and firing the multilayer compact.

2. The method according to claim 1, wherein the conductive paste has a PVC of from 60% to 80%.

3. The method according to claim 1, wherein
the conductive paste is a silver paste.

4. The method according to claim 1, wherein
the projecting portion has a thickness of from 1.0 μm to 10.0 μm.

5. The method according to claim 1, wherein
the projecting portion has a width of from 1.0 μm to 30.0 μm.

6. The method according to claim 1, wherein
the projecting portion has a tapered shape that tapers toward an outer side of the conductive paste layer.

7. The method according to claim 1, wherein
the conductive paste layer having the projecting portion is formed by using a printing plate.

8. The method according to claim 2, wherein
the conductive paste is a silver paste.

9. The method according to claim 2, wherein
the projecting portion has a thickness of from 1.0 μm to 10.0 μm.

10. The method according to claim 2, wherein
the projecting portion has a width of from 1.0 μm to 30.0 μm.

11. A multilayer coil component comprising:
an insulator portion;
a coil that is embedded in the insulator portion and includes a plurality of coil conductor layers electrically connected to one another;
outer electrodes that are disposed on surfaces of the insulator portion and are electrically connected to the coil;
a first void portion between the insulator portion and a main surface of each of the coil conductor layers; and
a second void portion that is at a same height as the first void portion and extends outward from side surfaces of each of the coil conductor layers in a horizontal direction, and a portion of the each of the coil conductor layers extends as a barrier between the first void portion and the second void portion so that the first void portion and the second void portion are out of communication with each other.

12. The multilayer coil component according to claim 11, wherein
each of the coil conductor layers has a thickness of from 1.0 μm to 90.0 μm.

13. The multilayer coil component according to claim 11, wherein
a ratio of a width of the first void portion to a width of the coil conductor layer is from 0.1 to 0.9.

14. The multilayer coil component according to claim 11, wherein
the first void portion has a thickness of from 1.0 μm to 10.0 μm.

15. The multilayer coil component according to claim 11, wherein
the second void portion has a thickness of from 1.0 μm to 10.0 μm.

16. The multilayer coil component according to claim 11, wherein
the second void portion has a width of from 1.0 μm to 30.0 μm.

17. The multilayer coil component according to claim 11, wherein
the second void portion has a tapered shape that tapers toward an outer side of the coil conductor layer.

18. The multilayer coil component according to claim 12, wherein
a ratio of a width of the first void portion to a width of the coil conductor layer is from 0.1 to 0.9.

19. The multilayer coil component according to claim 12, wherein
the first void portion has a thickness of from 1.0 μm to 10.0 μm.

20. The multilayer coil component according to claim 12, wherein
the second void portion has a thickness of from 1.0 μm to 10.0 μm.

* * * * *